US011184258B1

(12) United States Patent
Munro et al.

(10) Patent No.: US 11,184,258 B1
(45) Date of Patent: Nov. 23, 2021

(54) NETWORK ANALYSIS USING FORWARDING TABLE INFORMATION

(71) Applicant: Amazon Technologies, Inc., Seattle, WA (US)

(72) Inventors: David Munro, Bexley North (AU); Hiroshi Wada, Allawah (AU); Jack Stevenson, Sydney (AU); Agus Daud, Matraville (AU); Giles Parnell, Sydney (AU)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/559,115

(22) Filed: Sep. 3, 2019

(51) Int. Cl.
*G06F 15/173* (2006.01)
*H04L 12/26* (2006.01)
*H04L 12/24* (2006.01)

(52) U.S. Cl.
CPC ........ *H04L 43/045* (2013.01); *H04L 41/0853* (2013.01); *H04L 41/0873* (2013.01); *H04L 41/12* (2013.01); *H04L 43/067* (2013.01); *H04L 43/0882* (2013.01)

(58) Field of Classification Search
CPC . H04L 43/045; H04L 43/067; H04L 43/0882; H04L 41/0853; H04L 41/0873; H04L 41/12
USPC ........................................................ 709/224
See application file for complete search history.

(56) References Cited

U.S. PATENT DOCUMENTS

| 10,868,747 | B2 * | 12/2020 | Holbrook | H04L 43/0835 |
| 2006/0002309 | A1 * | 1/2006 | Ban | H04L 45/02 370/254 |
| 2008/0192651 | A1 * | 8/2008 | Gibbings | H04L 45/02 370/254 |
| 2012/0249588 | A1 * | 10/2012 | Tison | G06F 1/1696 345/633 |
| 2017/0222881 | A1 * | 8/2017 | Holbrook | H04L 43/0876 |
| 2019/0147352 | A1 * | 5/2019 | Ovsak | G06N 7/005 706/45 |
| 2019/0207843 | A1 * | 7/2019 | Horn | H04L 61/6018 |
| 2019/0222466 | A1 * | 7/2019 | Duda | H04L 45/58 |

* cited by examiner

Primary Examiner — Yves Dalencourt
(74) Attorney, Agent, or Firm — Klarquist Sparkman, LLP (57) ABSTRACT

A monitoring system is disclosed that achieves the benefits of active monitoring by providing a holistic view of the network, while obtaining the granularity of a passive monitoring system by testing a large majority or all of the prefixes. In one embodiment, streaming updates of a forwarding plane are captured for devices in a network. Additionally, an initial state of the forwarding plane can be captured for each device. A time-series graph of the forwarding plane can be constructed. In the graph, each node can represent a device and each edge can represent a possible path for a prefix at a given point in time. Graph analysis techniques can be used to analyze the graph and detect errors. For example, cycle detection algorithms can be used on the forwarding plane data to detect microloops. Other techniques can be used to find black holes or capacity bottlenecks.

20 Claims, 9 Drawing Sheets

NETWORK ANALYSIS USING FORWARDING TABLE INFORMATION

BACKGROUND

Large computer networks, such as those used in cloud computing, may contain hundreds or thousands of components of several types, such as switches, routers, and hubs. Generally, network routers receive packets on input ports and transmit the received packets to output ports based on a configuration of the network router. A forwarding table controls which next hops receive the packets. Typically, the forwarding table is programmed in accordance with routing strategies, such as equal-cost multi-path (ECMP) routing, which is a strategy where next-hop packet forwarding to a destination can occur over multiple best paths.

Testing of network routers can be problematic. In active monitoring, test probes are sent from a source host device through a network of routers to a destination host device. These so-called traceroutes can be used wherein a probe is sent to each hop between the source and destination and each hop returns a message indicating that the test probe was received. The probes are effective at testing the paths and links in the network, but require a lot of overhead as each network router typically receives a different probe and returns a response indicating that the probe was received. For example, ten different hops require ten probes to complete the traceroute. Such a large number of probes can impact network bandwidth. In passive monitoring, copies of network traffic can be captured by using a port mirror or network tap, and the copies can be transmitted to a monitoring server. The monitoring server can then show how the network traffic is progressing through the network. With passive monitoring, the more complex the network is, the more ineffective passive monitoring is at determining root causes of performance issues. More efficient techniques are needed for testing a network topology.

DETAILED DESCRIPTION

Active monitoring systems currently do not provide the granularity to test all network prefixes, as this would consume too many network resources and could impact network traffic. Passive monitoring systems often do not provide a holistic view of the network. A monitoring system is disclosed that achieves the benefits of active monitoring by providing a holistic view of the network, while obtaining the granularity of a passive monitoring system by testing a large majority or all of the prefixes used in a forwarding table.

In one embodiment, streaming updates of a forwarding plane are captured for devices in a network. Additionally, an initial state of the forwarding plane can be captured for each device.

In another embodiment, a time-series graph of the forwarding plane can be constructed for either online (streaming) or offline (batch) analysis. In the graph, each node can represent a device and each edge can represent a possible path for a prefix at a given point in time. Graph analysis techniques can be used to analyze the graph and detect errors. For example, cycle detection algorithms can be used on the forwarding plane data to detect microloops. Other techniques can be used to find black holes or capacity bottlenecks.

The disclosed embodiments provide details of all the paths in the network with greater precision than traditional probabilistic active monitoring approaches, such as sampled tracerouting. Additionally, the monitoring allows customers to compare before, during, and after a control-plane change.

In another embodiment, timestamped changes are captured at a regular interval or at irregular intervals. Routing tables from the devices are dumped automatically. By capturing regular dumps, drift can be detected and rapid seeking can be done to a time period of interest. A list of nodes can be maintained, which are considered static, and a list of edges (source, sink, prefix, start_time, end_time) can be stored in association with the nodes. As an update is received, any new edges are added to the list of edges, and any removed edges have an end_time set to the current time. Thus, a multi-digraph representation is generated that includes the history of the forwarding plane of the network. To perform analysis on this model, a prefix/ip and time are selected to analyze. Then a snapshot is captured of a time slice by dropping edges that are not active at the given point in time and that are not the most specific prefix. A simple static graph is generated that can be analyzed using techniques for cycle detection (microloops), blackholes, capacity, etc.

Figure 1:
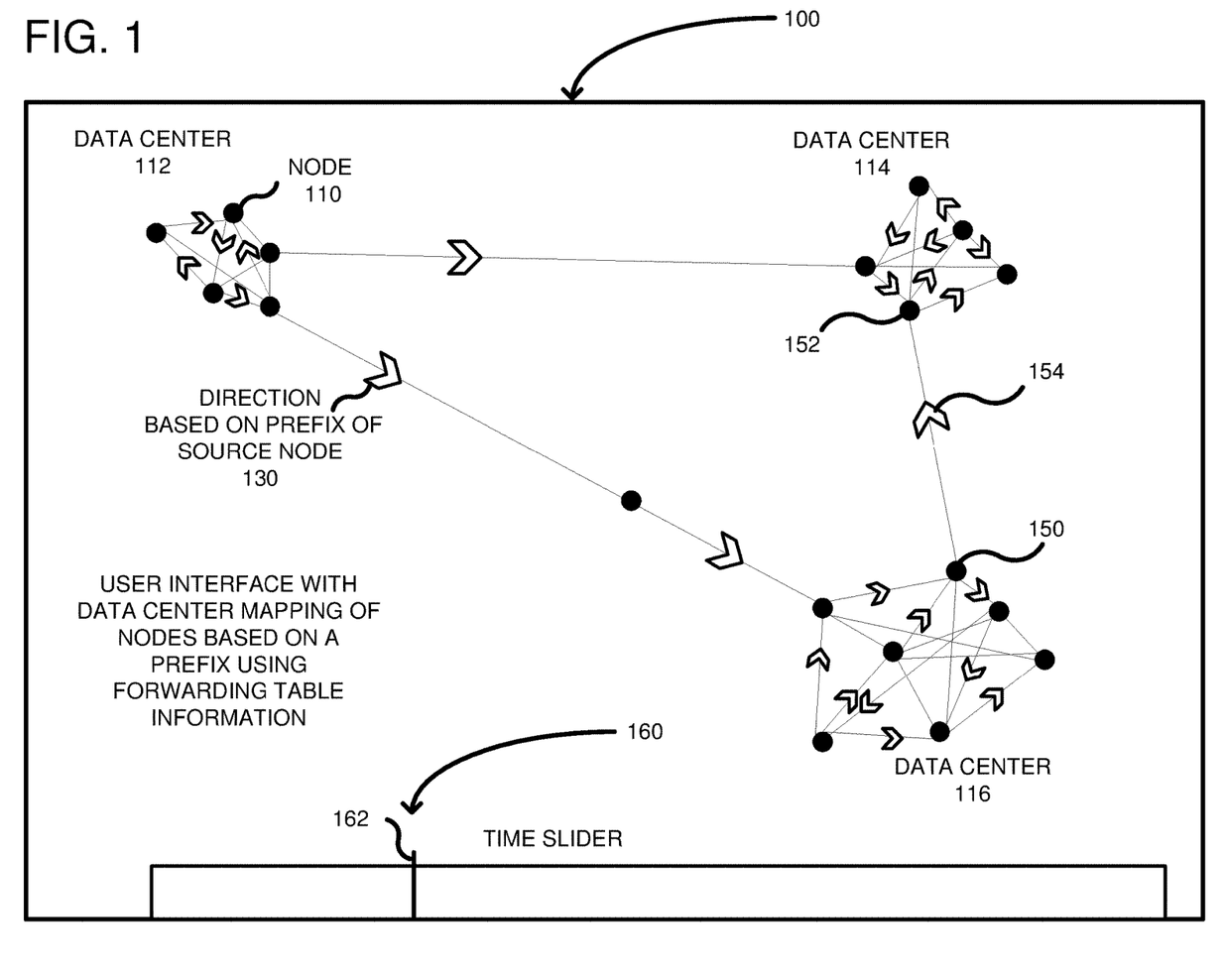
FIG. 1 is a User Interface (UI) according to one embodiment illustrating a plurality of data centers with network devices coupled together using directional connections associated with forwarding tables within the network devices.

FIG. 1 shows a user interface (UI) 100 including a plurality of nodes, such as node 110, which are shown as black circles. The nodes represent network devices in a computer network, wherein a network device can include routers, switches, load balancers, firewalls, or other devices used for forwarding packet data. The plurality of nodes are shown as within a plurality of data centers, such as data centers 112, 114, and 116. Each of the data centers is generally comprised of a group of networking equipment (e.g., servers, routers, switches, etc.) typically used for purposes of storage, processing and distribution of data. The data centers 112, 114, and 116 are shown as separated from each other, but that is merely for purposes of illustration, as the network devices can be all in a single data center.

Alternatively, the data centers 112, 114, and 116 can be in separate buildings coupled together by physical cabling. The UI 100 includes connections between the nodes with direction arrows, as indicated by arrow 130. As described further below, the connections and directional arrows are based on forwarding tables (e.g., Forwarding Information Base (FIB)) in the network devices. The forwarding tables include address information and interface information. Switching hardware in the network devices can receive a packet and, based on a destination address (or a prefix) can switch the packet to a particular interface on the network device based on a FIB lookup. For example, network device 150 can have a plurality of interfaces (not shown) for connecting to a plurality of other network switches, some of which are shown. However, at least one prefix or address has a FIB entry with an interface on the network device 150 that is coupled to a network device 152 (as is known through separate topology information). Thus, as the source node, the network device 150 can transmit packets towards the node 152. Accordingly, a direction arrow 154 is shown extending from the source node 150 to the destination node 152. Thus, the direction arrows point towards destination nodes based on FIBs in the source nodes. It should be understood that the depicted nodes and edges are for a single prefix so that a user can understand from the UI how the displayed prefix relates the network devices.

A time slider 160 is situated on the UI 100 and allows the user to view how the prefix in the FIBs change in time. A current time is selected using a pointer 162, which can be dragged and dropped anywhere along the time slider 160. Because updates to the FIBs of the network devices are periodically received, the UI shows how the FIBs for all the network devices change over time as a holistic view of the network's forwarding plane.

Figure 2:
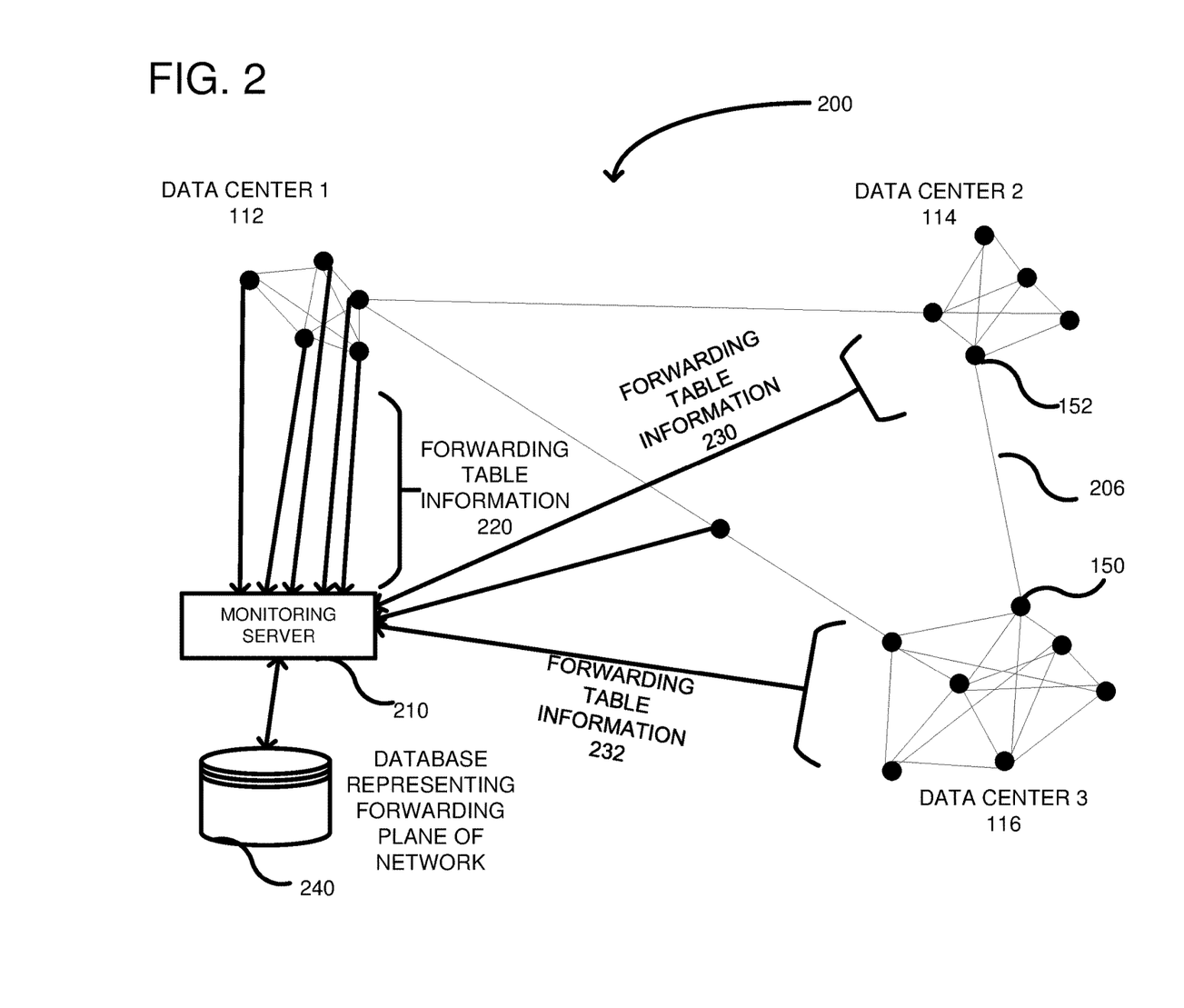
FIG. 2 illustrates an embodiment of a monitoring server receiving forwarding table information from the network devices of FIG. 1.

FIG. 2 shows an embodiment of a network 200 corresponding to what is depicted by the UI 100 of FIG. 1. The data centers 112, 114 and 116 are shown with physical connections between nodes using network cables. For example, nodes 150 and 152 are coupled together through a cable 206. Each network device within the network 200 is coupled via a network to a monitoring server 210, which receives an initial state of each forwarding table and/or updates to the forwarding tables. For example, the initial state and/or the updates are illustrated generically as "forwarding table information", and the forwarding table information is shown being sent to the monitoring server 210 at 220 from data center 1 112. Likewise, data center 2 114 and data center 3 116 send their respective forwarding table information to the monitoring server 210, as shown at 230, 232. Typically, the monitoring server 210 receives an initial forwarding table (e.g., the FIB) for each node and receives updates to the forwarding tables. As a result, the monitoring server 210 can use the updates to generate a current state of the FIBs in each node. The forwarding table information, such as at 220, need not be all of the updates, as it can be filtered updates based on prefixes or other parameters. Using all of the forwarding table information, the monitoring server 210 can build a data structure of the forwarding plane for the network 200 in a database 240. The database 240 can be any desired storage including memory in the monitoring server 210, a hard drive in the monitoring server or a separate storage from the monitoring server. Additionally, in an analogy to keyframe updates for video, periodically an entire forwarding table can be sent to the monitoring server instead of updates so as to correct for any drift between what the monitoring server 210 is storing as a current state of the forwarding tables and what is actually stored in the network devices.

Figure 3:
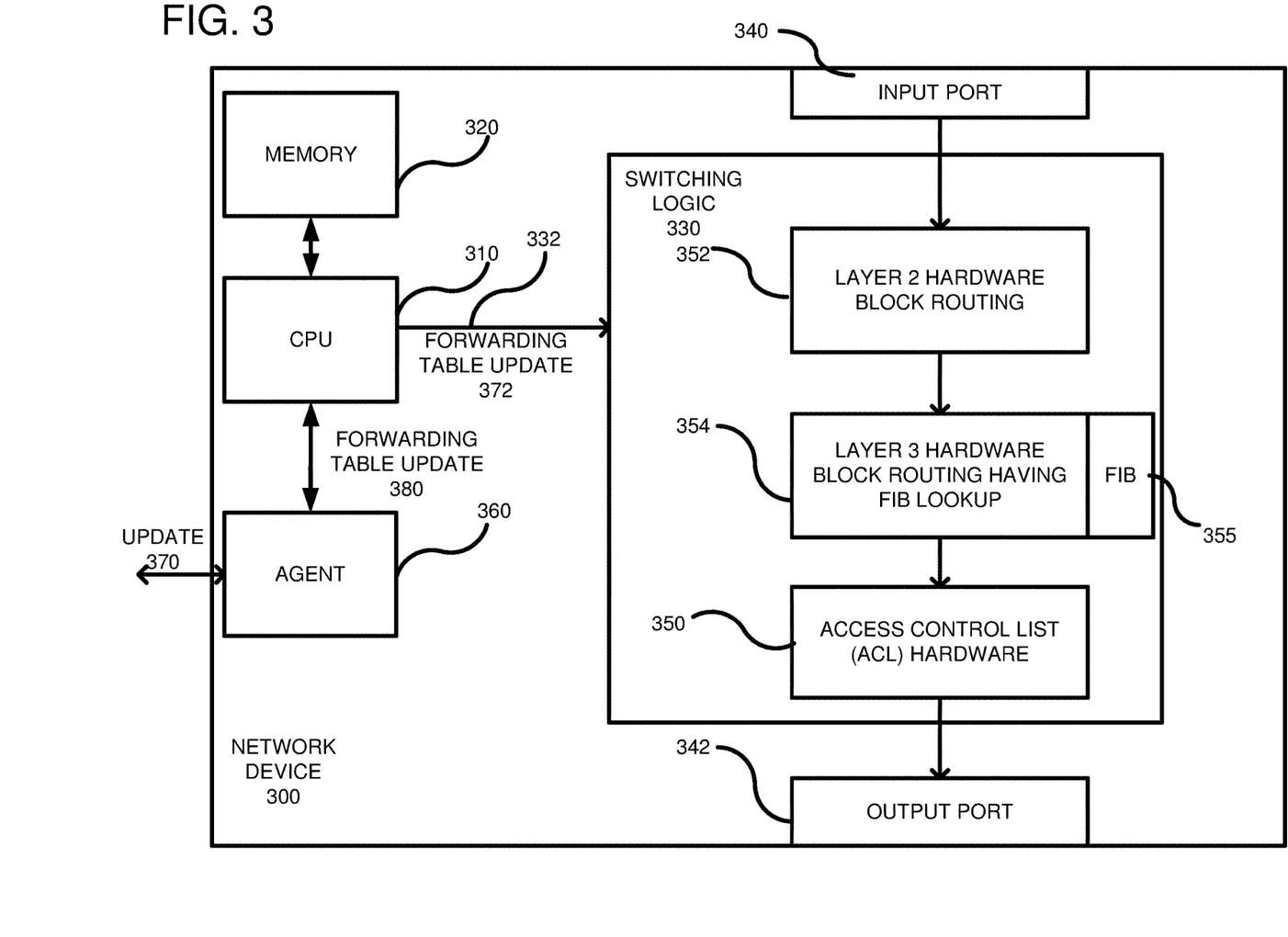
FIG. 3 is an embodiment of a network device that can be used to transmit the forwarding table information to the monitoring server of FIG. 2.

FIG. 3 shows a detailed example of an embodiment of the network device 300. Network device 300 is a switch that routes packets to a next hop in the network using a destination IP address. The network device 300 is an example of any of the network devices shown in FIGS. 1 and 2. A CPU 310 is coupled to a memory 320 and to switching logic 330 through a bus 332 (PCIe or other protocols and bus types can be used). The switching logic 330 is positioned between an input port 340 and an output port 342, which are typically adapted to receive network cables, such as Ethernet cables. Although only one input port 340 and one output port 342 are shown, typically there are multiple ports (also called interfaces) on a network device. The switching logic 330 can be a single ASIC integrated circuit or divided into multiple integrated circuits. The switching logic 330 can include multiple different hardware logic blocks including a layer 2 hardware block 352, a layer 3 hardware block 354, and an Access Control List (ACL) hardware block 350. The layer 2 hardware block 352 relates to an Ethernet layer and can forward packets based on MAC tables. The layer 2 lookup ensures that an incoming packet's MAC address equals the MAC address of the network device 300. If so, then the packet can proceed onto the layer 3 hardware. If not, then the layer 3 lookup does not occur. The layer 3 hardware block 354 relates to forwarding based on a longest prefix match of an IP address. Layer 3 typically involves a route lookup, decrementing the Time-To-Live (TTL) count, calculating a checksum, and forwarding the frame with the appropriate MAC header to the correct output port. The route lookup of the layer 3 hardware can include searching within a Forwarding Information Base (FIB) 355, which includes destination addresses (e.g., prefixes) for packets being transmitted through the switching logic and associated ports for forwarding the packets. The network device 300 can run routing protocols, such as an Open Shortest Path First (OSPF) or a Routing Information Protocol (RIP), to communicate with other Layer 3 switches or routers. The routing tables are used to lookup the route for an incoming packet. The ACL block 350 relates to permissions and can include rules whether to drop packets. The different hardware blocks can be coupled in series and additional hardware blocks can be added based on the design. Packets pass from the input port 340 to the output port in accordance with the configuration of the hardware logic blocks 350, 352, 354. The input port 340, output port 342 and switching logic 330 can be considered a data plane or forwarding plane of the network device 300. By contrast, the CPU 310, memory 320, and an agent 360 are considered part of a control plane.

As shown, the agent 360 can execute on the CPU 310 and can be used to transmit forwarding table information to the monitoring server 210 (FIG. 2), as indicated at 370. The CPU 310 typically receives updates to the forwarding table and uses the updates to program the FIB 355 into the switching logic 330, as indicated at 372. Whenever an update is received, the CPU can also check to determine if an agent, such as the agent 360, subscribed to the update so that an additional copy is sent to the agent. If so, the agent 360 can receive the forwarding table update, as shown at 380, to transmit to the monitoring server.

Figure 4:
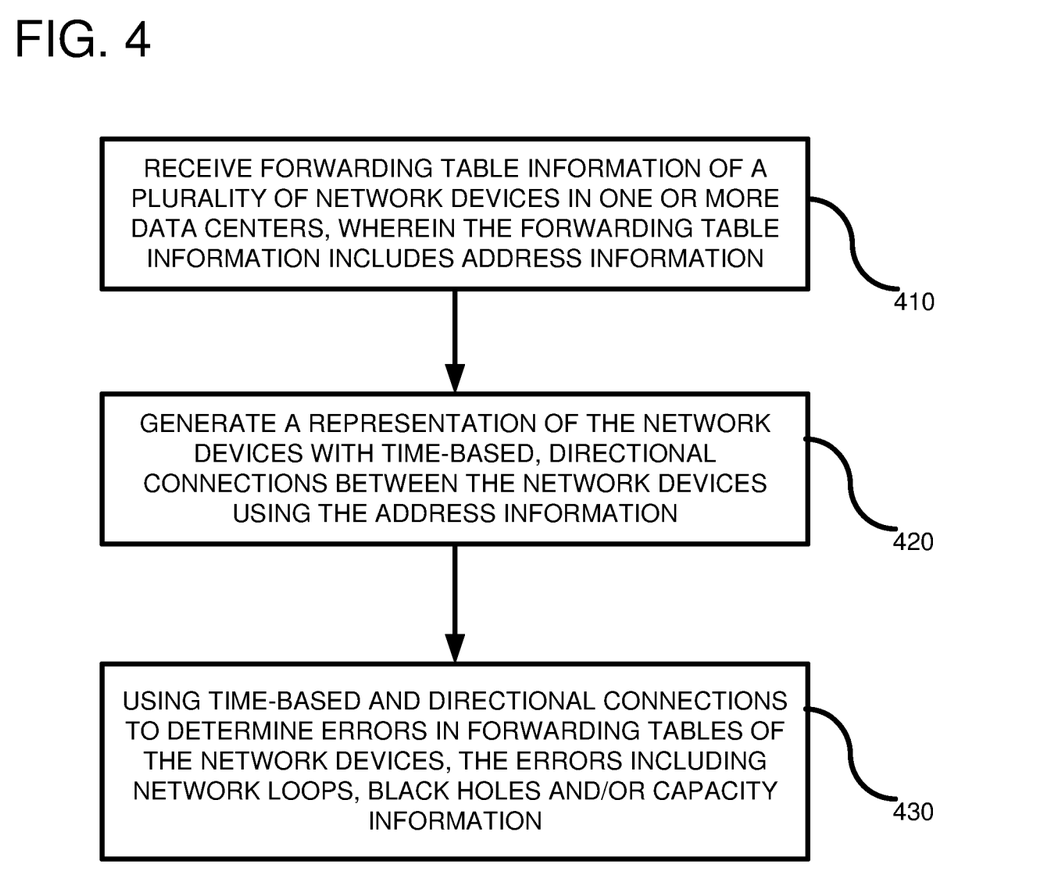
FIG. 4 is a flowchart according to one embodiment for correcting errors in a network using forwarding tables of network devices.

FIG. 4 is a flowchart of a method according to one embodiment. In process block 410, forwarding table information is received for a plurality of network devices in one or more data centers. The forwarding table information generally includes address information, such as a prefix or a full address, and an interface to which network traffic matching the address information is forwarded. The forwarding table information can include data from the FIB of network devices. For example, in FIG. 2, the monitoring server 210 receives the forwarding table information 220, 230, and 232 from different data centers. In FIG. 3, the agent 360 transmits the forwarding table information at 370, which can be a filtered version of the FIB 355 (such as FIB entries for certain prefixes), a portion of the FIB (such as an update), or the full FIB. In process block 420, a representation of the network devices is generated using time-based, directional connections between the network devices using the address information. The representation is shown in FIG. 1 as a UI, but the representation can be a simple data structure that integrates the forwarding information from all of the network devices into a single representation that can be used as a holistic view of the network. The directional connections are generated using known topology information (knowing what interfaces on one network device are coupled to other network devices) and the forwarding table information, which correlates addresses to interfaces. The network device, from which the FIB entry was received, is the source device and the arrow points in the direction of the neighbor, destination device. The connections are time-based because the FIB updates are time stamped so that a state of the forwarding table information at a point in time can be determined. Thus, as shown in FIG. 1, the time slider 160 can be used to visualize the state of a forwarding plane (all of the forwarding tables in the network) for a given prefix at any point in time. In process block 430, errors are determined using the time-based and directional connections. For example, errors in the forwarding tables can be determined by detecting microloops and black holes, as described below. Such errors can occur because, for example, updates can be sent to one network device, while another network device has not yet been updated. Thus, one network device can send a packet to a neighbor network device, and the neighbor network device can send the packet back because its forwarding table is outdated. Such a situation where a combination of network devices transmit a packet from a source device and back to the source device (through one or more other network devices) is a network loop (also called a microloop). Other errors include black holes wherein a first network device has a prefix and a direction towards a second network device, but the second network device does not have a directional output for the prefix. Thus, packets entering the second device with that prefix are dropped, due to a lack of a matching entry in the FIB. In another example of errors, capacity errors can occur, such as bottlenecks, wherein capacity between nodes changes at different times based on updates. Such so-called temporal bottlenecks can occur, for example, when two equal capacity paths exist between nodes A and B, and one of the paths changes at time T1 to a lower capacity, while the other remains at a larger capacity. According to ECMP, all traffic can be routed through the larger capacity path, thereby reducing the overall capacity between the two nodes. In a very particular example, if a source is connected to a sink through switches A and B, and both paths are 10G interfaces, the total capacity is 20G. Then if one of the interfaces is updated to 5G at time T1, the other 10G interface can take all of the traffic under ECMP until at time T2 when the 10G interface is also updated to 5G. Another example of bottlenecks is where a number of paths between a first and second node is greater than a number of paths between a second and third node. These errors can be determined programmatically through analysis of the database including the forwarding table information of the network devices.

Figure 5:
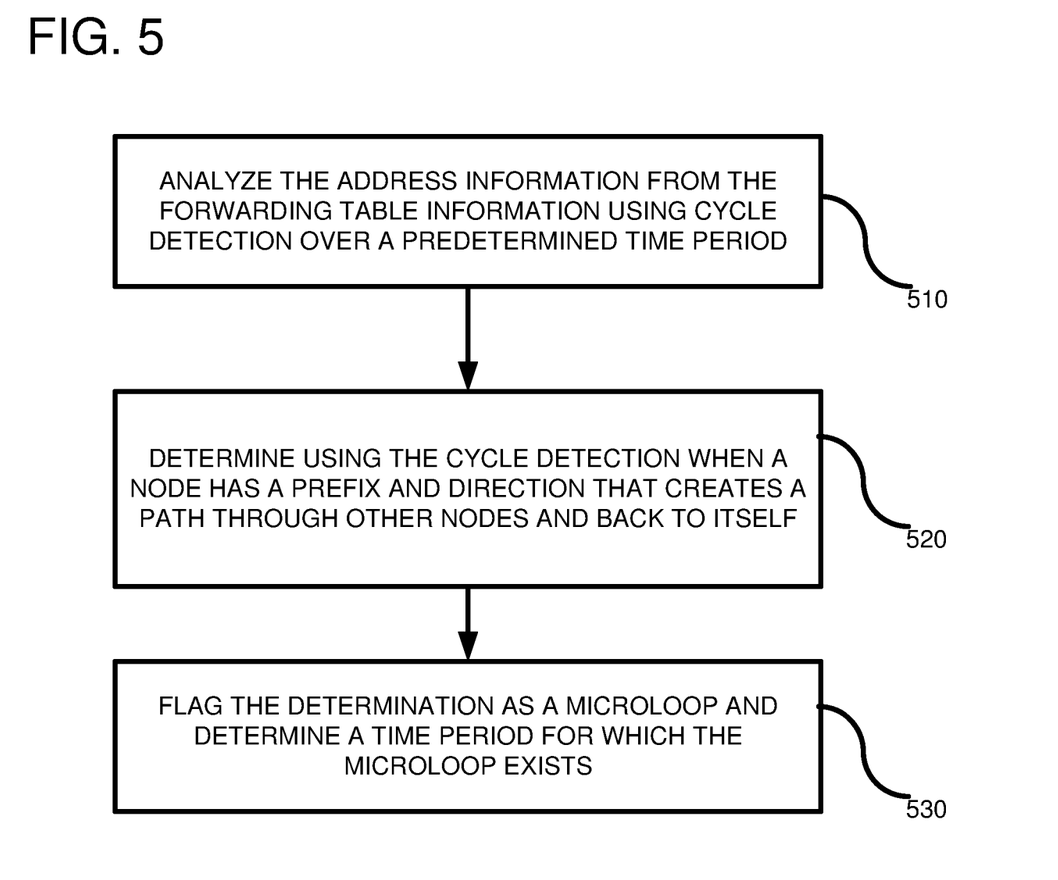
FIG. 5 is a flowchart according to another embodiment, wherein a microloop in a network can be detected using forwarding tables.

FIG. 5 is a flowchart of a method according to another embodiment for determining that the forwarding plane of the network has a microloop. In process block 510, address information is analyzed from the forwarding table information using a cycle detection algorithm over a predetermined period of time. For example, in FIG. 2, the monitoring server 210 can analyze the data structure of the forwarding plane in database 240, which includes a combination of the forwarding table information from each of the network devices in the network. The analyzing can include filtering the data using a particular prefix over the time period and using the cycle detection algorithm on the filtered data. In process block 520, the output of the cycle detection algorithm can be an identification of the nodes and interfaces that have a path back to themselves after passing through other nodes. Thus, for example, using the directional information and edges associated with the connection between nodes, a determination can be made whether there is a path that can pass from a first node, through one or more other nodes, and back to the first node. In process block 530, the determined node can be flagged as having a microloop. Additionally, a time period can be associated with the FIB entry that causes a microloop. The flagging can include displaying the error on the UI, such as the UI 100 of FIG. 1. The flagging can further include transmitting a notification to another server computer or alerting an administrator for taking corrective action.

Figure 6:
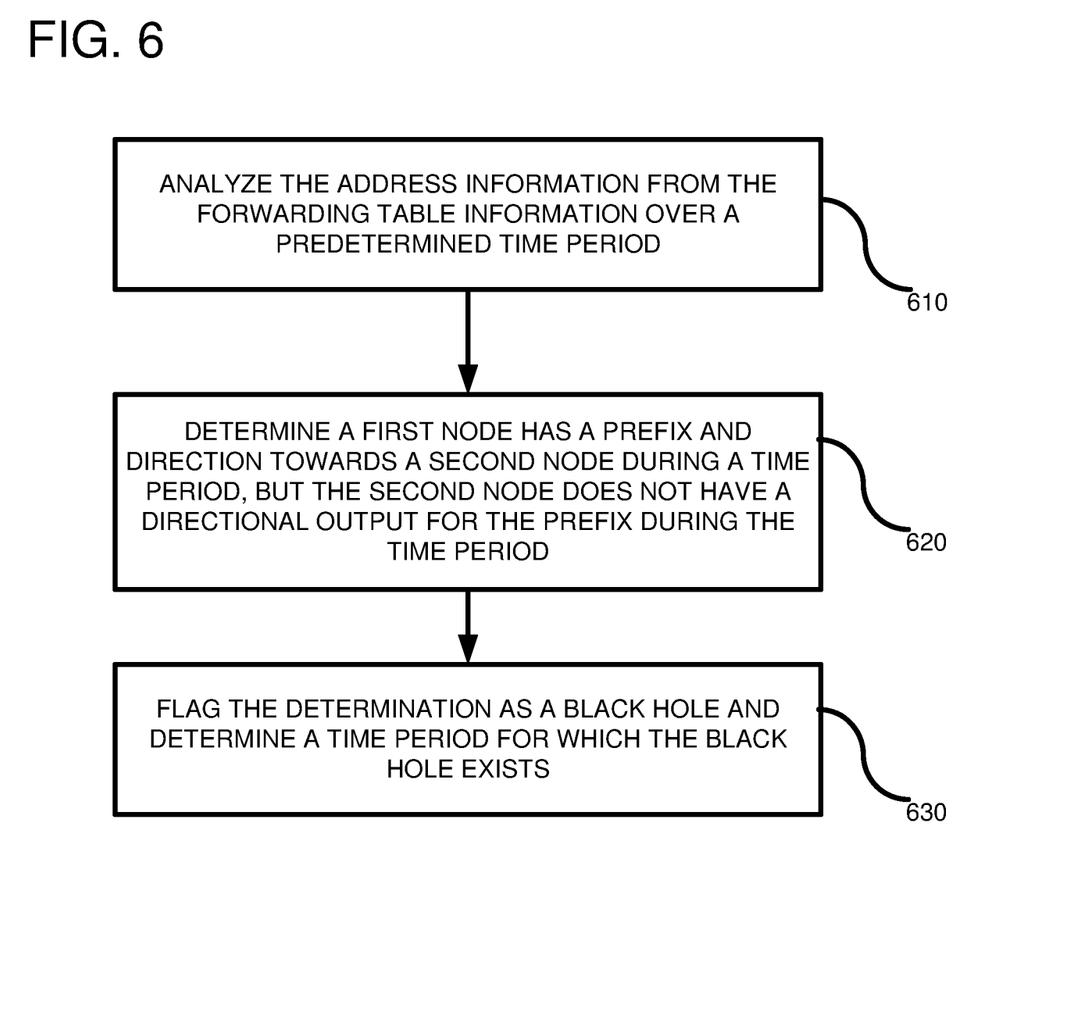
FIG. 6 is a flowchart according to another embodiment, wherein a black hole in a network can be detected using forwarding tables.

FIG. 6 is a flowchart of a method for determining whether a black hole exists in the forwarding plane of the network. In process block 610, address information is analyzed from the forwarding table information over a predetermined period of time. For example, in FIG. 2, the forwarding table information 220, 230, 232 is received from a plurality of network devices and is stored in the database 240 as a representation of the forwarding plane of the network 200. The representation has address information (e.g., network prefixes, full addresses, etc.) that can be analyzed as a whole. In process block 620, a first node's FIB is determined to have a prefix and direction towards a second node during a time period, but the second node's FIB does not have a directional output for the same prefix during the time period. Thus, packets entering the first node and transmitted to the second node are dropped by the second node because the FIB in the second node lacks an entry for the prefix. In process block 630, the determination is flagged as a black hole and the time period can be logged for the period that the black hole exists. The flagging can include displaying the error on the UI, such as UI 100 of FIG. 1. The flagging can further include transmitting a notification to another server computer or alerting an administrator for taking corrective action.

Figure 7:
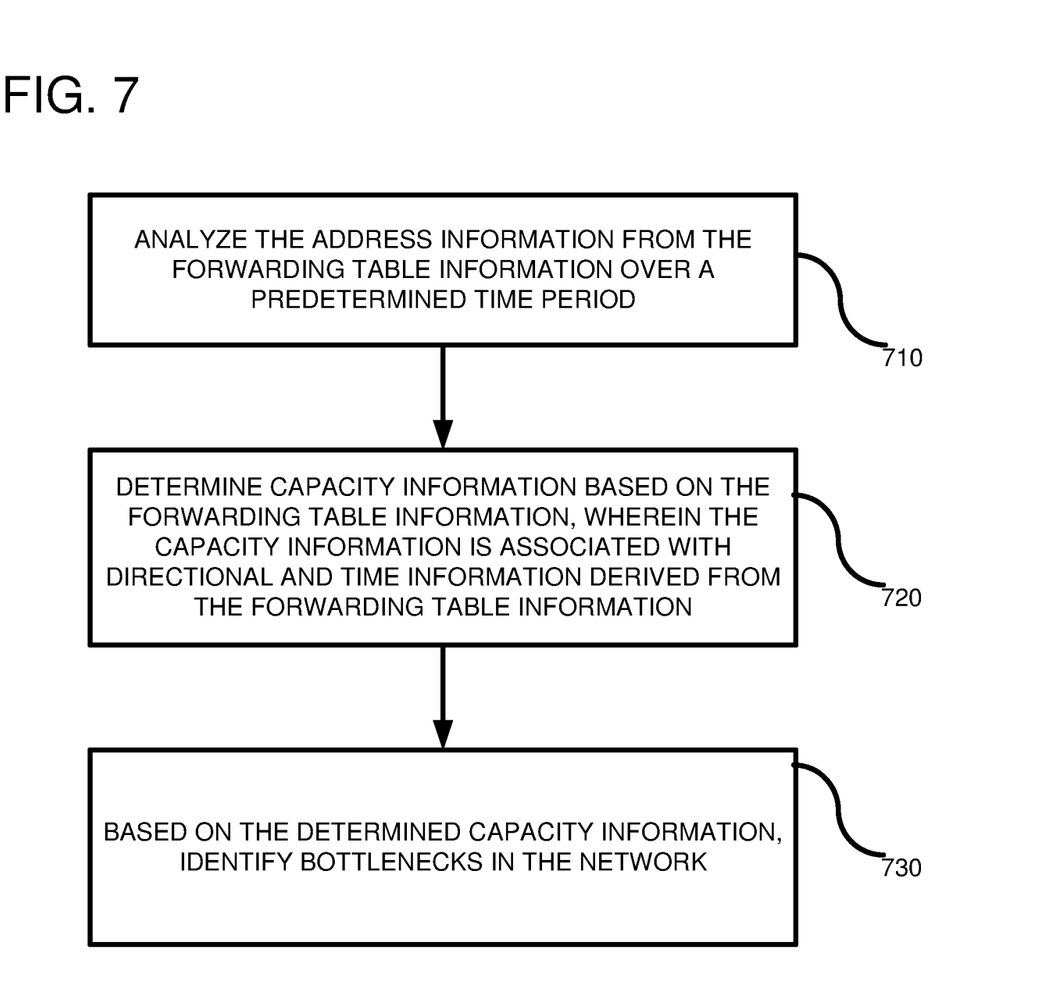
FIG. 7 is a flowchart according to another embodiment, wherein bottlenecks in a network can be determined using forwarding tables.

FIG. 7 is a flowchart of a method according to one embodiment for determining if capacity errors are within the forwarding plane. In process block 710, address information is analyzed from the forwarding table information over a predetermined period. For example, in FIG. 2, the forwarding table information 220, 230, 232 is received from a plurality of network devices and is stored in the database 240 as a representation of a forwarding plane of the network 200. The representation has address information (e.g., network prefixes, full addresses, etc.) that can be analyzed as a whole. In process block 720, capacity information can be determined based on the forwarding table information, wherein the capacity information is associated with directional and timing information and is derived from the forwarding table information. For example, there can be three directional arrows extending from a first node to a second node, and two directional arrows extending from the second node to the third node. Thus, using forwarding table information, it can be determined when the capacity between different nodes changes. In process block 730, based on the determined capacity information, bottlenecks can be identified. For example, a count can be generated for directional arrows between nodes, and if the count changes more than a predetermined amount, then a bottleneck can be flagged. Temporal bottlenecks can also be identified by determining capacity changes related to time. Actual capacity can also be determined by incorporating topology information into the analysis, such as the capacity associated with any of the interfaces.

Figure 8:
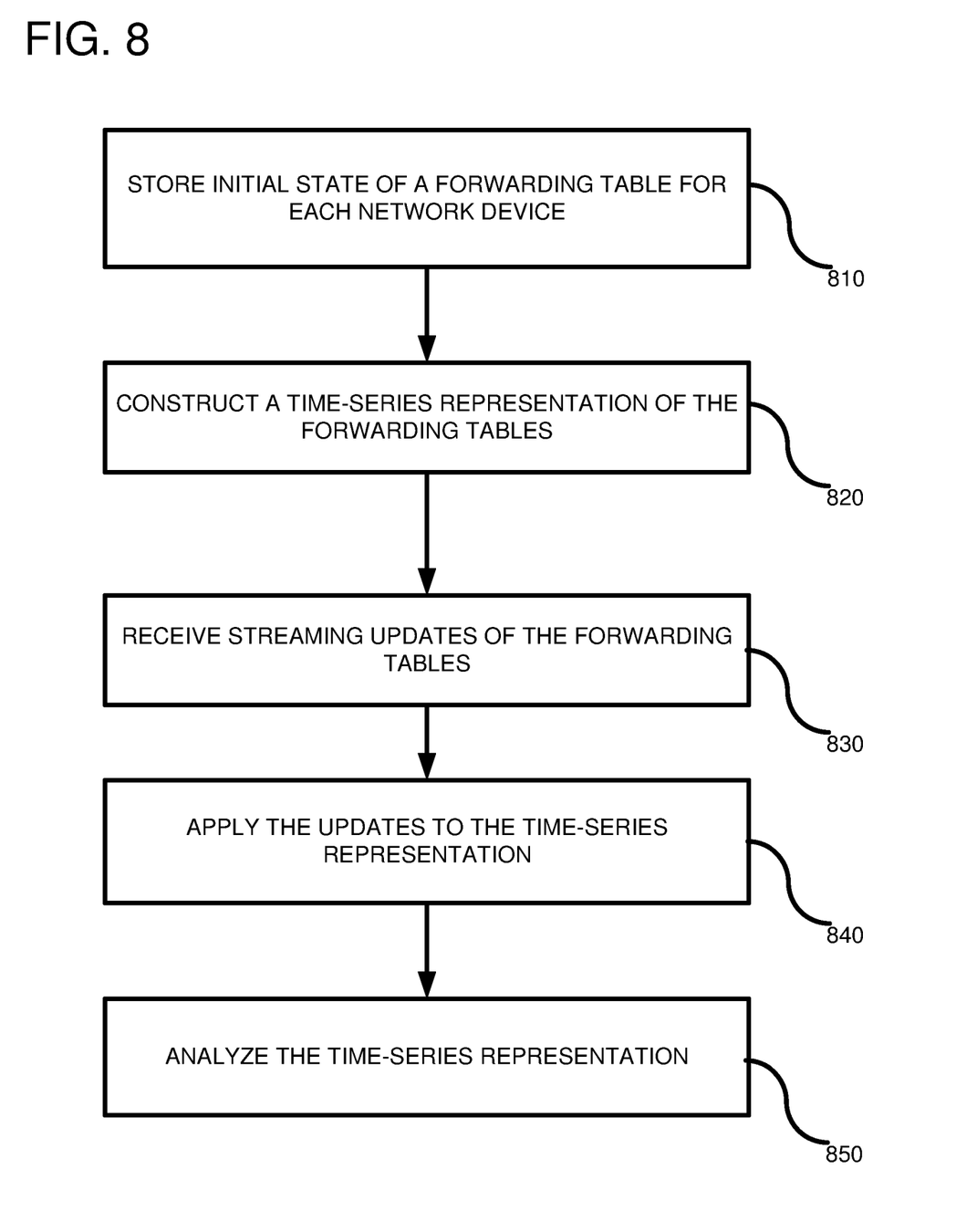
FIG. 8 is a flowchart according to another embodiment for analyzing network devices in a data center.

FIG. 8 is a flowchart according to another embodiment for analyzing network devices in a data center. In process block 810, an initial state of the forwarding table for each network device can be stored. For example, in FIG. 2, the initial state of the forwarding table can be included in the forwarding table information, or it can be supplied to the monitoring server 210 using a different technique. For example, a server computer pushing the FIBs to the network devices can similarly push the FIBs to the monitoring server 210. In still another alternative, the monitoring server 210 can pull data from another database (not shown). In any case, the initial state of the forwarding tables can be stored in database 240. In process block 820, a time-series representation is constructed of the forwarding tables. An example time-series representation is shown in FIG. 1, wherein the forwarding plane can be viewed at different points in time. To construct the time-series representation, the data stored in database 240 can be manipulated in a data structure that allows the data to be pulled based on prefixes and time periods. There are many techniques for building such a data structure, which depends on design choice. In process block 830, streaming updates are received of the forwarding tables. For example, FIG. 2, the monitoring server 210 receives the forwarding table information 220, 230, 232 from the network devices, which can be updates to the initial FIB. In process block 840, the updates are applied to the time-series representation. For example, in FIG. 2, the monitoring server 210 can supplement the time series representation shown in FIG. 1 with the updates so as to generate a current state of the forwarding plane for the entire network 200. Finally, in process block 850, the time-series representation can be analyzed. For example, the data structure within database 240 can be analyzed by executing algorithms on the data, such as a cycle detection algorithm.

Figure 9:
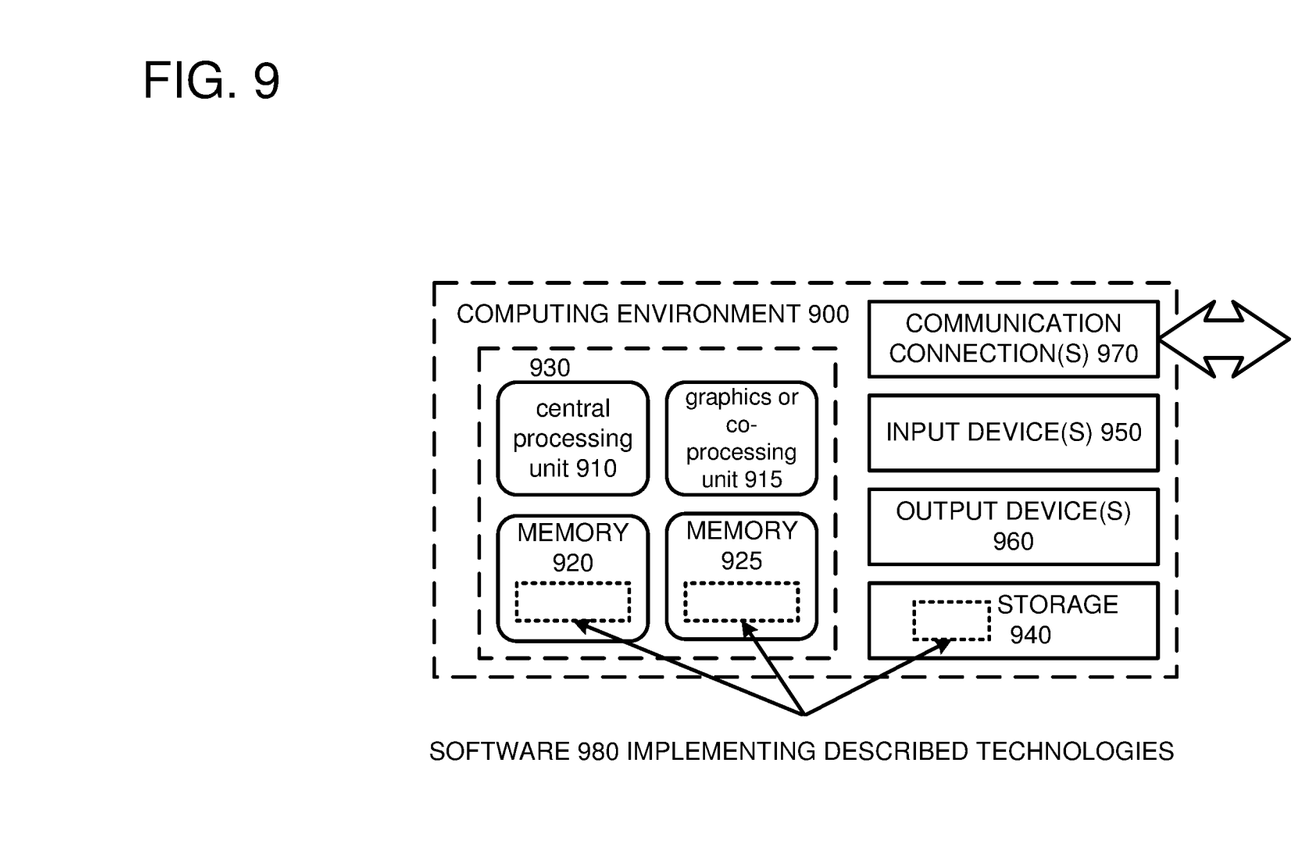
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s). The computing environment 900 can be used, for example, as the monitoring server 210 and/or can be used for displaying the UI of FIG. 1.

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of analyzing network devices in a data center, comprising:
   in a monitoring server, storing an initial state of a forwarding table for each of the network devices, the forwarding table including at least a prefix and an interface for the prefix;
   constructing a time-series representation of the forwarding tables of the network devices for prefixes of the forwarding tables, the time-series representation including time-based, directional connections between the network devices, wherein each directional connection is based on the prefix and the interface;
   receiving in the monitoring server, streaming updates of the forwarding tables for each of the network devices;
   applying the updates of the forwarding tables to the time-series representation so as to generate a current state of the forwarding tables for each of the network devices;
   and
   analyzing the time-series representation for detecting errors in the forwarding tables.

2. The method of claim 1, wherein the time-series representation includes a User Interface having nodes representing the network devices and the directional connections represent a direction of potential packet flow.

3. The method of claim 1, wherein the analyzing includes using cycle detection to determine when the forwarding tables have a prefix and a direction that start at a first network device and take a path through one or more other network devices back to the first network device.

4. The method of claim 1, wherein the analyzing includes determining a first network device that has a prefix and direction towards a second network device, and the second network device does not have a directional output for the prefix.

5. The method of claim 1, wherein the analyzing includes determining bottlenecks between network devices by analyzing capacity at different points in time between first and second network devices.

6. A method, comprising:
   receiving forwarding table information of a plurality of network devices, wherein the forwarding table information includes destination address information and an interface for the destination address information;
   generating a representation of the plurality of network devices using time-based and directional connections between the network devices, wherein generating directional connections uses the destination address information and the interface; and
   using the time-based and directional connections, determining errors in the forwarding table information.

7. The method of claim 6, wherein the forwarding table information includes streaming updates received from each of the network devices.

8. The method of claim 6, wherein the time-based and directional connections are for each prefix in the forwarding table information.

9. The method of claim 6, wherein the forwarding table information includes streaming updates with periodic updates to an entire forwarding table to correct drift.

10. The method of claim 6, wherein the determining errors includes using cycle detection to determine when the forwarding tables have a prefix and a direction that start at a first network device and take a path through one or more other network devices back to the first network device.

11. The method of claim 6, wherein the determining errors includes determining a first network device that has a prefix and direction towards a second network device, and the second network device does not have a directional output for the prefix.

12. The method of claim 6, wherein the determining errors includes determining bottlenecks between network devices by analyzing capacity between the network devices at different points in time.

13. The method of claim 6, wherein the network devices include switches within a data center and the forwarding table information is programmed into the switches for forwarding network traffic.

14. The method of claim 6, further including displaying a user interface including the representation of the plurality of network devices for a prefix.

15. The method of claim 14, wherein the user interface includes a slider associated with time, and the user interface displays the directional connections for a prefix of the address information for a point in time as indicated by the slider.

16. A computer-readable medium including instructions that when executed by one or more processors cause a computer system to perform a method comprising:
receive forwarding table information of a plurality of network devices, wherein the forwarding table information includes destination address information and an interface for the destination address information;
generate a representation of the plurality of network devices using time-based and directional connections between the network devices, wherein generate directional connections uses the destination address information and the interface; and
using the time-based and directional connections, determine errors in the forwarding table information.

17. The computer-readable medium of claim 16, wherein the forwarding table information includes prefixes and interfaces stored in the network devices and is used for switching network traffic through the network devices.

18. The computer-readable medium of claim 16, wherein a monitoring server computer coupled to the plurality of network devices generates the representation and the monitoring server computer receives updates of the forwarding table information from the plurality of network devices.

19. The computer-readable medium of claim 16, wherein the instructions further cause the computer system to display errors associated with the forwarding table information.

20. The computer-readable medium of claim 19, wherein the errors include network loops, black holes and bottlenecks associated with capacity of a network.

\* \* \* \* \*